US011847229B1

(12) United States Patent
Nielson

(10) Patent No.: US 11,847,229 B1
(45) Date of Patent: *Dec. 19, 2023

(54) SYSTEM, DEVICE, AND METHOD FOR TRANSIENT EVENT DETECTION

(71) Applicant: FEDERAL HOME LOAN MORTGAGE CORPORATION, McLean, VA (US)

(72) Inventor: Dylan Nielson, Washington, DC (US)

(73) Assignee: FEDERAL HOME LOAN MORTGAGE CORPORATION, McLean, VA (US)

( * ) Notice: Subject to any disclaimer, the term of this patent is extended or adjusted under 35 U.S.C. 154(b) by 337 days.

This patent is subject to a terminal disclaimer.

(21) Appl. No.: 17/167,405

(22) Filed: Feb. 4, 2021

Related U.S. Application Data

(63) Continuation of application No. 15/590,824, filed on May 9, 2017, now Pat. No. 10,922,416.

(51) Int. Cl.
| | |
|---|---|
| *G06F 21/57* | (2013.01) |
| *G06F 21/62* | (2013.01) |
| *G06F 11/07* | (2006.01) |
| *G06F 11/14* | (2006.01) |
| *G06Q 40/03* | (2023.01) |

(52) U.S. Cl.
CPC ........ *G06F 21/577* (2013.01); *G06F 11/0709* (2013.01); *G06F 11/1425* (2013.01); *G06F 21/6263* (2013.01); *G06Q 40/03* (2023.01)

(58) Field of Classification Search
CPC .............. G06F 21/577; G06F 21/6263; G06F 11/0709; G06F 11/1425; G06Q 40/025

USPC .......................................................... 726/25
See application file for complete search history.

(56) References Cited

U.S. PATENT DOCUMENTS

| | | |
|---|---|---|
| 8,356,007 B2 | 1/2013 | Larson |
| 8,504,470 B1 | 8/2013 | Chirendast |
| 9,081,501 B2 | 7/2015 | Asaad |
| 2008/0097777 A1 | 4/2008 | Rielo |
| 2010/0223276 A1 | 9/2010 | Al-Shameri |
| 2010/0293090 A1 | 11/2010 | Domenikos |
| 2013/0097125 A1* | 4/2013 | Marvasti ................ G06F 16/90 707/E17.002 |
| 2013/0129307 A1 | 5/2013 | Choe |

(Continued)

OTHER PUBLICATIONS

Lietao et al., 2013 IEEE Transactions On Knowledge and Data Engineering, "Efficient and Effective Duplicate Detection in Hierarchical Data", pp. 1028-1041 (Year: 2013).*

(Continued)

*Primary Examiner* — Khalil Naghdali
(74) *Attorney, Agent, or Firm* — MH2 TECHNOLOGY LAW GROUP, LLP

(57) ABSTRACT

A device includes processing circuitry configured to receive node data including attributes from at least one computing device, organize the node data into one or more node groupings, wherein each node grouping includes nodes of the node data having one or more shared attributes, determine a node grouping processing scheme based on one or more transient event detection priorities, and detect, in response to executing the node grouping processing scheme for each of the one or more node groupings, one or more transient event occurrences within the one or more node groupings.

19 Claims, 11 Drawing Sheets

(56) References Cited

U.S. PATENT DOCUMENTS

2014/0046827 A1     2/2014   Hochstatter
2015/0207809 A1     7/2015   Macaulay

OTHER PUBLICATIONS

Xu et al., 2016 IEEE, International Conference on Cyber-Enabled Distributed Computing and Knowledge Discovery, pp. 18-26 (Year: 2016).*

IEEE Power and Energy Society, "IEEE Standard for Electric Power Systems Communications-Distributed Network Protocol (DNP3)", Oct. 10, 2012, IEEE, IEEE Std 1815™-2012 (Revision of IEEE Std 1815-2010) (Year: 2012).

\* cited by examiner

| Identification Key | 202 |
| Submission Number | 204 |
| Submission Date | 206 |
| Applicant(s) | 208 |
| Property Address | 210 |
| Transaction Execution Status/Date | 212 |
| Transaction Type | 214 |
| Co-resident Status | 216 |
| Down Payment Amount | 218 |
| Type of Loan Product | 220 |

| ID Key | 302 | 777222444 | | |
|---|---|---|---|---|
| Submission Number | 304 | ...26f56e2 | ...26xx777 | ...2bbb22 |
| Submission Date | 306 | 9-25-13 | 9-25-13 | 9-25-13 |
| Applicant(s) | 308 | A | | |
| Property Address | 310 | 123 Main Street | | |

| 400 | | | | | | | |
|---|---|---|---|---|---|---|---|
| | 412 | 414 | 416 | 418 | 420 | 422 | |
| ID Key 402 | 7772224444 | 88367230 | 98502211 | 78801499 | 66685638 | 55555566 | |
| Submission Number 404 | ...26xx777 | ...c8735e | ...a5d5b51 | ...d5e2e2 | ...899e2e2 | ...65mn23 | |
| Submission Date 406 | 9-25-13 | 11-20-13 | 12-20-13 | 12-20-13 | 1-17-14 | 1-31-14 | |
| Applicant 408a | ...2bf5e2 | | | | ...2en26hr | | |
| Applicant 408b | 9-25-13 | | | | 1-31-14 | | |
| Applicant 408c | 9-25-13 | A | | | C | | |
| Applicant 408d | | B | | | D | | |
| Property Address 410a | 123 Main Street | | 123 Main Street | | 123 Main Street | | |
| Property Address 410b | | 123 long Rd | | | | | 444 Village Trail |
| PropertyAddress 410c | | | | | | | |

*FIG. 4A*

SYSTEM, DEVICE, AND METHOD FOR TRANSIENT EVENT DETECTION

CROSS REFERENCE TO RELATED APPLICATIONS

This is a continuation application of U.S. application Ser. No. 15/590,824, filed May 9, 2017, the contents of which are hereby incorporated by reference herein.

SUMMARY

In an exemplary implementation, a device includes processing circuitry configured to receive node data including attributes from at least one computing device, organize the node data into one or more node groupings, wherein each node grouping includes nodes of the node data having one or more shared attributes, determine a node grouping processing scheme based on one or more transient event detection priorities, and detect, in response to executing the node grouping processing scheme for each of the one or more node groupings, one or more transient event occurrences within the one or more node groupings.

BRIEF DESCRIPTION OF THE FIGURES

FIG. 2 is an exemplary diagram of node data;

FIG. 4A is an exemplary diagram of a node grouping;

FIG. 5C illustrates an example server interface for connecting user computing devices within a platform for transient event detection.

Like reference symbols in various drawing indicate like elements.

DETAILED DESCRIPTION

Figure 1:
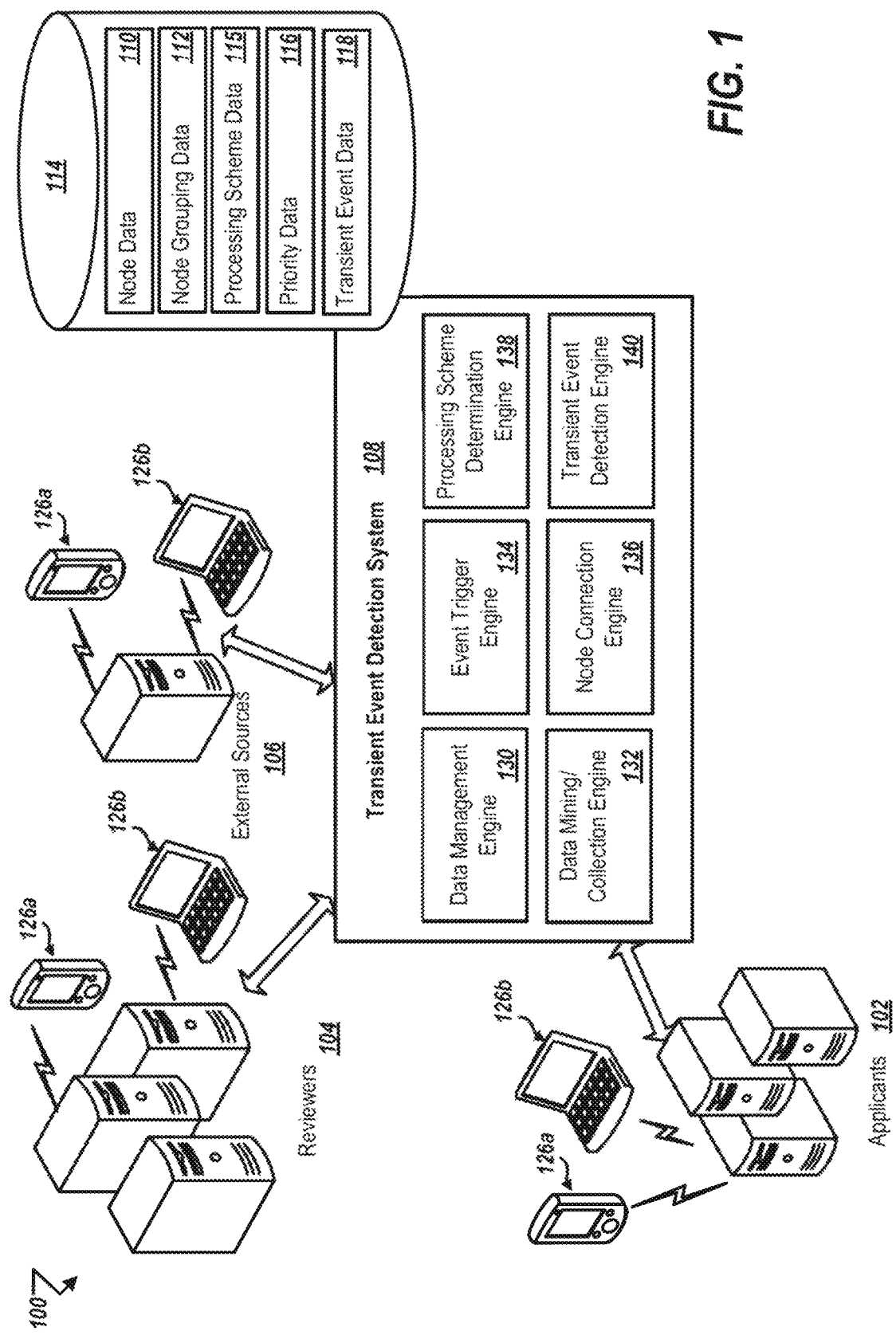
FIG. 1 is an exemplary diagram of an example environment for a transient event detection system.

FIG. 1 is a diagram of an example environment 100 for a transient event detection system 108. The diagram illustrates a series of interactions between one or more participants and devices in the transient event detection system 108 which is configured to detect transient event occurrences. Transient event occurrences can be defined by a starting time and an ending time rather than by identification codes, people, or other associated factors. Transient events can also be referred to interchangeably as time-limited events. Utilizing this format, the transient event detection system 108 can be configured to efficiently store and organize information to provide a more accurate depiction of data coming into the system. This allows the transient event detection system 108 to more accurately generate information based on analysis of the stored data. For example, the transient event detection system 108 can be configured to detect occurrences of one or more people seeking a loan for a property (e.g., a mortgage) that can include multiple combinations of applicants and submitted loan applications.

Figure 7:
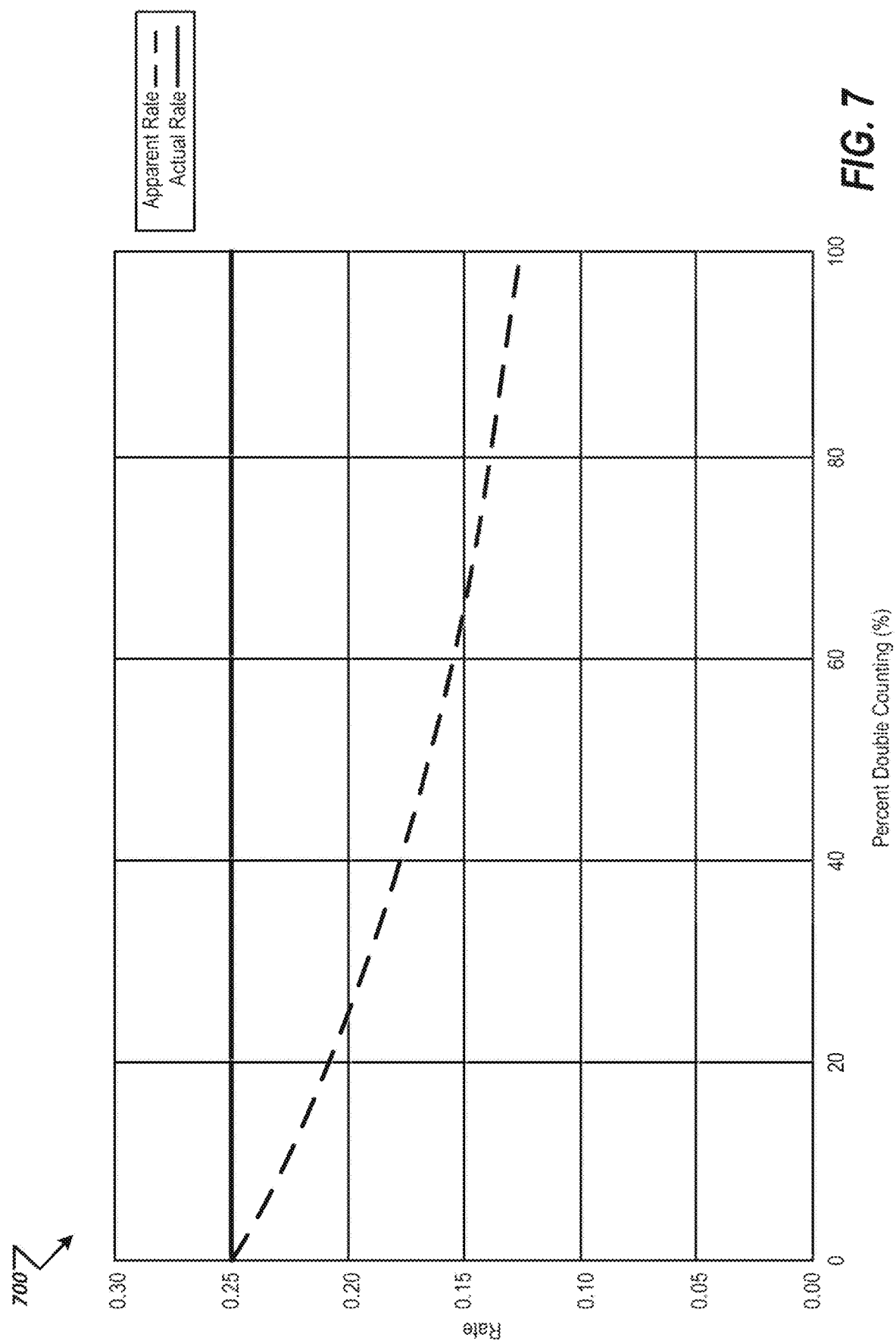
FIG. 7 is an exemplary graph illustrating the effect of redundant data on a measured rate.

In conventional implementations, submitted loan applications am each counted as a transient event having a uniquely assigned identification (ID) key. However, measuring transient event occurrences by numbers of assigned ID keys can provide overinflated numbers of submitted loan applications as one or more applicants seeking to obtain a mortgage may submit applications with multiple lenders with multiple combinations of applicants before the mortgage is finally funded. For instance, for a given sample set, there may be only eighty percent as many transient events as number of assigned ID keys. This indicates that there are a large number of submitted loan applications that are redundant or potentially fraudulent and which should not count as separate events. The overinflating of submitted loan applications leads to an artificially low loan pull-through rate calculation, which is a performance metric used by lenders or mortgage buyers to indicate a mortgage funding rate. An exemplary graph that shows the effect of redundant data is shown in FIG. 7.

The transient event detection system 108 receives node data that includes attributes associated with loan application transactions, determines connections between the node data based on shared attributes of the transactions, groups the node data based on the shared attributes, and processes the grouped node data to identify one or more transient event occurrences within the groupings. The transient event detection system 108 may be associated with a particular agency that reviews and/or approves mortgage origination or purchasing of mortgages, such as mortgage lenders, mortgage buyers, and the like. Alternatively, the transient event detection system 108 may be associated with any entity that analyzes immense amounts of information to provide analysis results of the data and applications based on this analysis. This could include any type of recommendation engine or other artificially intelligent system that could, based on the features described herein, provide more accurate recommendations that are not based on redundantly weighted nodal data.

In one implementation, the transient event detection system 108 may be associated with any entity that monitors counterparties. The transient event detection system 108 can be configured to detect appraisers having different license numbers. As such, the transient event detection system 108 can determine connection(s) between entities in the mortgage market (e.g., individual appraisers, management companies, backers) and provide monitoring that is not based on faulty data such as entities that appear to be unconnected, for example, an appraiser having different license numbers.

In certain aspects, the transient event detection system 108 automates and expedites processing and detection of transient event occurrences. For example, processing incoming node data over a predetermined period of time can create a processing burden on processing resources of the transient event detection system 108 due to sheer volume of transactions and relationships between the attributes of the transactions. For example, a nodal network that includes all connections between all node data received by the transient event detection system 108 could result in millions of distinct nodes with multiple connections therebetween.

To address this concern, the transient event detection system 108 can efficiently and effectively organize the node data into the node groupings which drastically reduces a number of nodes that are processed when detecting transient event occurrences. For example, when identifying a transient event associated with a particular submitted mortgage application, the transient event detection system 108 only processes the node grouping associated with the submitted application rather than all of the node data stored in a data repository 114 of the system. In addition, the transient event detection system 108 uses a graphical form to create the nodal network which minimizes parallel comparisons used in querying a relational table thus minimizing recursion calls and in turn minimizing computation time, the amount of computations and processing required as well as reducing memory requirements. The transient event detection system 108 therefore represents a technical solution to the technical problem of generating inaccurate performance metric calculations and also to the problem of inefficiently generating this information. This is a problem that may affect strategic business decisions and has plagued the industry by resulting in the perpetuation and propagation of faulty data which leads to problems with filtering between accurate an inaccurate data and proper and effective database management. The system described herein addresses these issues by not only providing enhanced metrics that are more accurate but also by providing these with lower processing and memory burdens. Therefore, using the system described herein, lenders will be provided with more accurate performance metrics related to number of transactions and pull-through rate. The transient event detection system 108 also provides improvements to various technical fields such as data management, data storage and graphical/nodal analysis. Further, it vastly improves upon the functionality of existing computer systems by providing enhanced storage paradigms which result in faster data acquisition and task processing speeds.

Further, faulty data may create a false protected class or fail to identify a protected class. Using the system described herein, protected-class oversight groups can monitor mortgage lending statistics with respect to minority groups or other protected classes to ensure equitable lending practices are used without the problem of having false positive or false negative due to faulty data. In addition, lenders may determine accurately the number of applications that will be eligible for a new product or a new program using the system described herein. Thus, minimizing the errors in optimizing models associated with the new product or the new program. For example, faulty data may lead to unnecessary changes in a model being optimized, which in turn leads to an ineffective model that may fail to protect a targeted protected class. Therefore, the transient event detection system 108 further provides improvements to the technical field of models development and optimization.

Applicants 102 include a plurality of computing devices and databases distributed across a widely dispersed network that may be distributed across a large, international geographic area. The applicant network can be separate and independent from any network associated with any other participant or entity in the transient event detection environment 100, such as external sources 106 or reviewers 104. In some implementations, the applicants 102 can include borrowers who are applying for a mortgage by submitting an application via one or more computing devices 126 that can include mobile device 126a, computer 126b, or any other type of external computing device. In some implementations, the applicants 102 can also include mortgage lenders who submit mortgage applications on behalf of the borrowers.

The applicants 102 can submit the loan applications to the transient event detection system 108 in a predetermined format, such as in PDF format or any other document format. In some implementations, the appraisal reports can be submitted at one or more user interface screens via a website where the applicants 102 upload transaction data to the transient event detection system 108. The data provided to the transient event detection system 108 from the applicants 102 may be independent from the other participants and in a different format than the data provided by the external sources 106 and reviewers 104. Alternatively, the transient event detection system 108 can proactively access data uploaded by the applicants 102 on various different platforms such as applicant-local sources and/or the external sources 106.

The reviewers 104 include a plurality of computing devices and databases distributed across a widely dispersed network that may be distributed across a large, international geographic area. In some implementations, the reviewers 104 can include mortgage lenders or buyers or any entity that reviews loan applications and loan origination statistics. The reviewers 104 can also include fraud detection entities that attempt to detect fraudulently submitted mortgage applications. The reviewers 104 can also include other special-interest entities such as protected-class oversight groups that monitor mortgage lending statistics with respect to minority groups or other protected classes to ensure equitable lending practices are used. The reviewer network can be separate and independent from any network associated with any other participant in the transient event detection environment 100, such as the external sources 106 or applicants 102. The reviewers 104 can provide inputs to the transient event detection system 108 that can include transient event priorities, which can be stored in the data repository 114 as priority data 116. In some implementations, the transient event priorities include priorities of one or more various types of reviewers 104 that may affect how the node grouping data is processed. In some implementations, data is stored in the data repository 114 based on the transient event priorities. For example, a transient event priority of fraud detection may result in a different node grouping processing scheme than a transient event priority of protected class monitoring.

The reviewers 104 can also receive outputs from the transient event detection system 108 that may include a transient event report resulting from a transient event detection process. In some implementations, the transient event report includes information regarding performance metrics associated with the transient event occurrences along with any other statistics associated with the transient event priorities of the reviewers 104. The data provided to the transient event detection system 108 from the reviewers 104 may be independent from the other participants and in a different format than the data provided by the external sources 106 and applicants 102.

The external sources 106 include a plurality of computing devices and databases distributed across a widely dispersed network that may be distributed across a large, international geographic area. The external source networks can be separate and independent from any network associated with any other participant in the transient event detection environment 100, such as the applicants 102 or reviewers 104. In addition, the data handled and stored by the external sources 106 may be in a different format than the data handled and stored by the other participants of in the transient event detection environment 100. In some implementations, the external sources 106 may include public data sources that include node data that may be accessible to other participants in the transient event detection environment 100, such as the applicants 102 and reviewers 104. For example, the external sources 106 can be connected to the transient event detection system 108 via a wired or wireless network and can include public property records systems, credit report systems, loan origination systems, and any other data source that may be associated with submitted mortgage applications. The data provided to the transient event detection system 108 from the external sources 106 may be independent from the other participants and in a different format than the data provided by the applicants 102 or reviewers 104.

The applicants 102, reviewers 104, and external sources 106, and data repository 114 can connect to the transient event detection system 108 through computing devices 126 (e.g., mobile device 126a, computer 126b, or any other type of computing device) via a wired or wireless network (not shown). The network can include one or more networks, such as the Internet and can also communicate via wireless networks such as WI-FI, BLUETOOTH, cellular networks including EDGE, 3G and 4G wireless cellular systems, or any other wireless form of communication that is known.

The transient event detection system 108 includes one or more engines or modules that perform processes associated with receiving node data that includes attributes associated with loan application transactions, determining connections between the node data based on shared attributes of the transactions, grouping the node data based on the shared attributes, and processing the grouped node data to identify one or more transient event occurrences within the groupings. References to the engines or modules throughout the disclosure are meant to refer to software and/or hardware processes executed by circuitry of one or more processing circuits, which can also be referred to interchangeably as processing circuitry. In some implementations, the processes associated with the transient event detection system 108 can be performed by one or more servers having one or more processing circuits such that some steps may be performed on different servers.

In one example, the transient event detection system 108 includes a data management engine 130 that organizes the data received by the transient event detection system 108 from the applicants 102, reviewers 104, and external sources 106 and also controls data handling during execution of the processes described further herein. In some implementations, the data management engine 130 processes data gathered by a data mining/collection engine 132 from the applicants 102 and external sources 106 and loads the gathered data to data repository 114 as node data 110, which can be a database of data files of transaction attributes included in mortgage applications received from the applicants 102. The node data can be stored in the form of a neural network having nodal connections between nodes storing the data. In addition, the data management engine 130 may perform a data validation/normalization process to configure the received mortgage applications and other node data into a predetermined format compatible with a format of the files of the data repository 114 and ensure that data associated with the mortgage applications have been properly completed.

The data management engine 130 also controls the interaction of the transient event detection system 108 with at least one data repository 114 associated with the transient event detection environment 1W. For example, the data management engine 130 can output automatically updated data such as node data 110, node grouping data 112, processing scheme data 115, priority data 116, and transient event data 118 to the data repository 114. In some implementations, the data uploaded to the data repository 114 can be either manually or automatically updated. For example, node grouping data 112 that includes all shared attributes between one or more nodal connections can be automatically generated by node connection engine 136 as will be described in further detail herein. The data management engine 130 can also access any of the data from the data repository 114 for use by the transient event detection system 108 and also controls the flow of data between the data repository 114 and the transient event detection system 108.

The transient event detection system 10g also includes a data mining/collection engine 132 that controls the gathering of data from the applicants 102, reviewers 104, and external sources 106 in real-time. In some implementations, the data mining/collection engine 132 receives the submitted mortgage applications input to the transient event detection system 108 by the applicants 102, extracts node data from the submitted mortgage applications, and passes the node data 110 to the data management engine 130. In addition, the data mining/collection engine 132 can receive automatically and/or continuously updated data from one or more of the external sources 106. For example, the data mining/collection engine 132 can perform web crawling processes of websites associated with public property records systems, credit report systems, and loan origination systems to detect data updates at websites and/or data servers associated with the external sources 106. In addition, the data mining/collection engine 132 can receive other manually entered information from the participants in the transient event detection environment 100, such as transient event priorities that can be input by the reviewers 104.

FIG. 2 is an exemplary diagram of node data 200 (corresponding to node data 110 of FIG. 1) collected from the submitted mortgage applications by the data mining/collection engine 132 that can include one or more attributes. For example, the node data 200 extracted from the submitted mortgage applications can include a uniquely assigned ID key 202 that distinguishes a transaction (e.g., a mortgage application) from other transactions. A transaction can also have multiple associated submissions in which additional information is provided by the applicants 102. The submissions associated with a transaction can include a submission number 204 and corresponding submission date 206. The node data 200 can also include names or identifications (e.g., social security number, driver's license number) associated with one or more applicants 208 or borrowers as well as property address 210 associated with the mortgage application. The node data 200 can also include a transaction execution status and corresponding date 212 that can indicate whether the mortgage associated with the application has been funded, is pending, or has been canceled. Transaction type 214 is another type of node data 200 that can indicate whether the mortgage application is for a home purchase or refinance. The node data 200 can also include other attributes, such as a co-resident status 216, a down-payment amount 218, type of loan product 220 (conventional, VA, FHA, etc.), or any other attribute that can be used to identify related mortgage applications associated with a single transient event occurrence.

Referring back to FIG. 1, the transient event detection system 108 also includes an event trigger engine 134 that manages the flow of data updates to the transient event detection system 108. In some implementations, the data miming/collection engine 132 detects updates to node data 110, node grouping data 112, transient event data 118, or any other type of data collected or controlled by the transient event detection system 108. In response to detecting an update to node data 110, the event trigger engine 134 loads the updated node data 110 to the node connection engine 136 to store the updated node data 110. In addition, the event trigger engine 134 operates automatically to trigger the data management engine 130 when updated data is detected by the data mining/collection engine 132.

The event trigger engine 134 is also configured to detect updates to the data stored in the data repository 114 from the one or more data sources at multiple update velocities. The update velocity of the data corresponds to a rate or frequency at which the transient event detection system 108 receives data updates from the various applicants 102, reviewers 104, and external sources 106. For example, node data 110 gathered from websites associated with the external sources 106 may be updated at varied frequencies, and applicants 102 may submit mortgage applications to the transient event detection system 108 at varied times and frequencies.

Figures 3A, 3B:
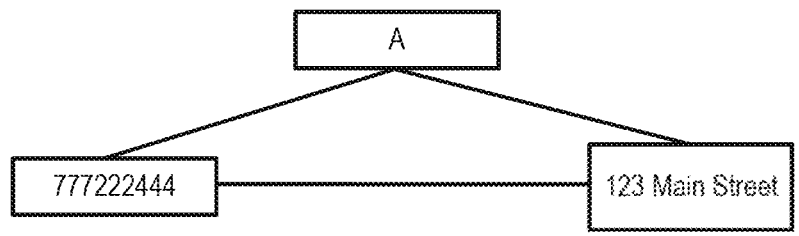
FIG. 3A is an exemplary diagram of node data for a transaction.
FIG. 3B is an exemplary diagram of connections between node data.

The transient event detection system 108 also includes a node connection engine 136 that establishes connections between attributes, also referred to as nodes, of node data 110 associated with a particular transaction and also organizes the node data 110 obtained by the data mining/collection engine 132 into one or more node groupings based on shared attributes between nodes associated with one or more transactions. FIGS. 3A-3B are exemplary diagrams illustrating connections between nodes associated with a particular transaction. For example, FIG. 3A illustrates node data 300 for a transaction that includes an ID key 302, three submissions with corresponding submission numbers 304 and submission dates 306, identification information for an applicant 308, and a property address 310. In response to receiving the node data 300, the node connection engine 136 establishes connections between one or more nodes of the node data, as shown by graphical representation 312 in FIG. 3B. For example, connections are established between the applicant 308 (A), the ID key 302 (777222444), and the property address (123 Main Street).

Figure 4B:
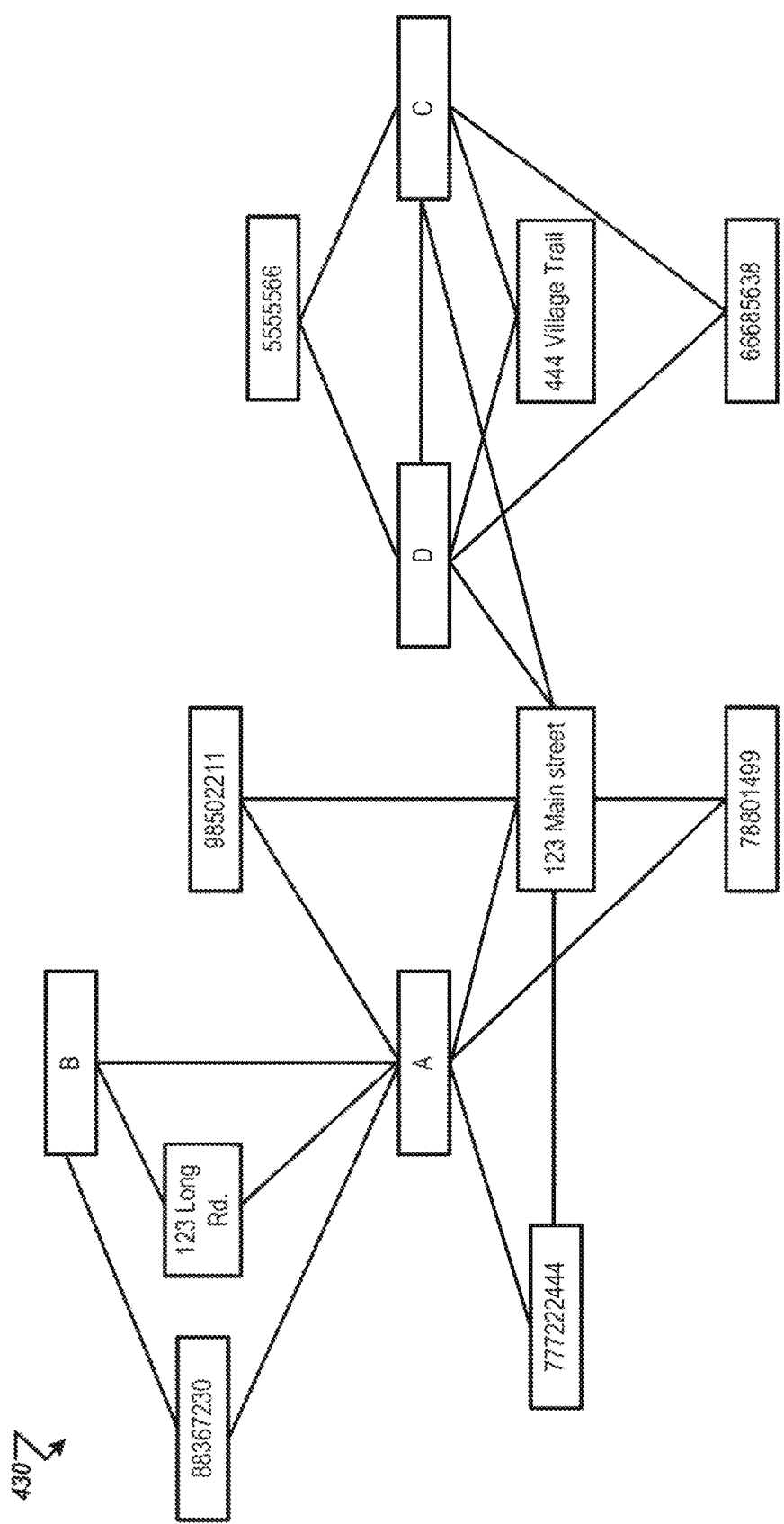
FIG. 4B is an exemplary diagram of connections between node data of a node grouping.

In addition, if node data 110 associated with two submitted mortgage applications share an applicant with one another, then the node data 110 associated with each of the two submitted mortgage applications are organized together into a node grouping along with any other node data that share any other attributes, such as property address, ID key, transaction type, and the like. FIGS. 4A-4B are exemplary diagrams illustrating connections between nodes associated with various transactions included in a node grouping. For example, node grouping 400 includes node data for transactions 412, 414, 416, 418, 420, and 422 associated with submitted mortgage applications. Each of the transactions 412, 414, 416, 418, 420, and 422 has a corresponding ID key 402, at least one submission number 404, at least one submission date 406, at least one applicant 408, and a property address 410. A single transaction can have more than one corresponding submission, such as transactions 412 and 420. Multiple submissions associated with a single transaction can indicate instances of when additional information is provided by an applicant 102, such as an updated employer or salary of the applicant 102. In addition, each of the transactions 412, 414, 416, 418, 420, and 422 share at least one attribute with one of the other transactions in the node grouping 400. For example, transaction 412 shares an applicant attribute 408a with transactions 414, 416, and 418 and also shares a property address attribute 410a with transactions 416 and 418. In addition, transaction 420 shares a property address attribute 410a with transaction 412, 416, and 418. FIG. 4B includes a graphical representation 430 of connections between attributes (also referred to as nodes) of the transactions 412, 414, 416, 418, 420, and 422 shown in FIG. 4A.

Referring back to FIG. 1, the transient event detection system 108 also includes a processing scheme determination engine 138 that determines a node grouping processing scheme that is used to detect transient event occurrence within a node grouping. The node grouping processing scheme can be based on one or more transient event priorities of the reviewers 104, such as fraud protection, protected class monitoring, and the like. In some implementations, the node grouping processing scheme can be a tiered decision scheme that includes one or more decision tiers that are used to detect the transient event occurrences. For example, the decision tiers can include an ID key tier, a transaction execution status tier, a transaction execution date tier, a shared applicant tier, a transaction type tier, a submission date tier, and a property address tier. Details regarding the decision tiers are discussed further herein. In some implementations, the processing scheme determination engine 138 determines an ordering of the one or more decision tiers based on the transient event priorities of the reviewers 104. The ordering of the decision tiers associated with various types of transient event priorities can be stored as processing scheme data 115 in the data repository 114, which can be input by the reviewers at the computing devices 126. In some examples, the processing scheme determination engine 138 can determine that another type of node grouping processing scheme can be implemented other than the tiered decision scheme.

In response to the node grouping processing scheme being determined, a transient event detection engine 140 processes one or more node groupings according to the node grouping processing scheme to identify one or more transient event occurrences within a node grouping, which is stored as transient event data 118 in the data repository 114. In some implementations, for a tiered decision scheme, each decision tier indicates whether the node data for a particular transaction within a node grouping is assigned to an existing transient event occurrence or whether an additional transient occurrence is generated for the node data. For example, if the submission dates of two submissions for a particular transaction are separated by more than a predetermined time period (e.g., 120 days), then an additional transient event occurrence is generated for the most recent submission. A particular node grouping, such as the node grouping 400 (FIG. 4) can include one or more than one transient event occurrence that is less than or equal to a number of transactions included in the node grouping. Details regarding the execution of the node grouping processing scheme are discussed further herein. In response to processing the node data for all of the transactions in the one or more node groupings, the transient event detection engine 140 outputs a report to the reviewers 104 indicating the performance metrics associated with the transient event occurrences along with any other statistics associated with the transient event priorities.

In some implementations, data associated with the processes performed by the transient event detection system 108 is stored in one or more data repositories of the transient event detection environment 100 such as the data repository 114. Data received by or obtained from the transient event detection system 108 from the applicants 102, reviewers 104, and external sources 106 can be stored in real-time with respect to when the data is received from the data sources. In addition, one or more types of data can be stored automatically in response to receiving one or more data files from the data sources. The data stored in the data repository 114 can be auto-load data that is updated automatically from one or more sources at predetermined time intervals or whenever new or updated data is detected. For example, auto load data can include the node data 110 associated with submitted mortgage applications that is automatically updated by the data mining/collection engine 132 in response to receiving the node data 110 from the applicants 102.

The data stored in the data repository 114 can also include manually entered information that is input via UIs, such as those of the external devices 126, and is received by the data mining/collection engine 132 of the transient event detection system 108. The manually entered information can be processed by the data management engine 130 before being disseminated to other processing engines of the transient event detection system 108. The manually entered data can include the priority data 116 and processing scheme data 115. The data repository 114 can also store process execution data that is generated by the transient event detection system 108 when executing the processes associated with detecting transient event occurrences. For example, the process execution data can include the node grouping data 112 and transient event data 118. For example, the transient event data 118 can include sets of linked transactions that have been identified as transient event occurrences within a node grouping by the transient event detection engine 140.

Figure 5:
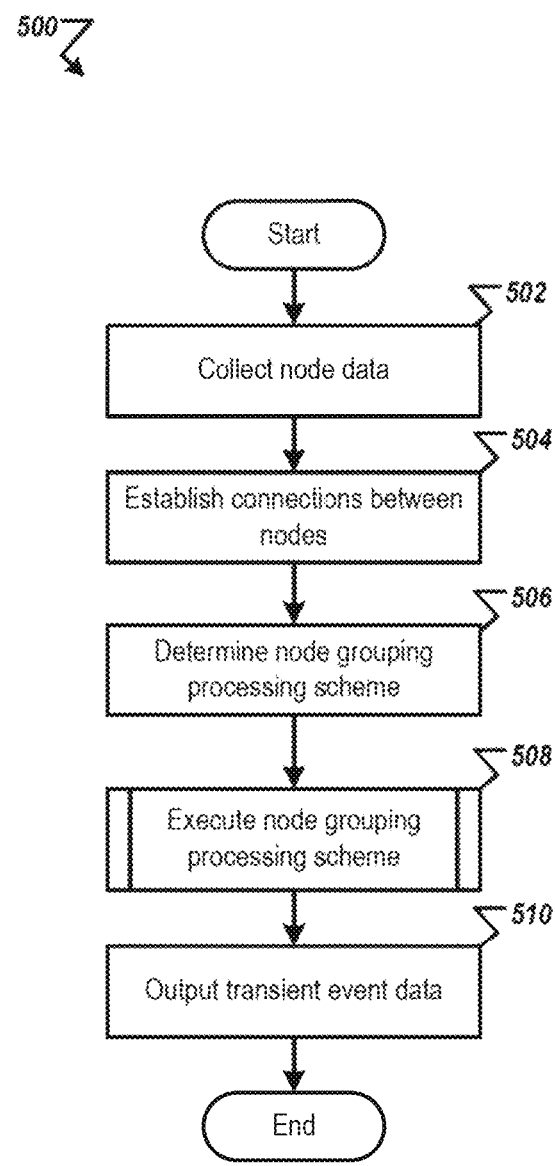
FIG. 5 is an exemplary flowchart of a transient event detection process.

FIG. 5 is an exemplary flowchart of a transient event detection process 500. The transient event detection process 500 is performed by one or more of the processing engines of the transient event detection system 108, such as the data mining/collection engine 132, the node connection engine 136, the processing scheme determination engine 138, and the transient event detection engine 140.

At step 502, the data mining/collection engine 132 collects node data 110 from the applicants 102 and/or external sources 106. In some implementations, the data mining/collection engine 132 receives the submitted mortgage applications input to the transient event detection system 108 by the applicants 102, extracts node data 110 from the submitted mortgage applications. In addition, the data mining/collection engine 132 can receive automatically and/or continuously updated data from one or more of the external sources 106. For example, the data mining/collection engine 132 can perform web crawling processes of websites associated with public property records systems, credit report systems, and loan origination systems to detect data updates at websites and/or data servers associated with the external sources 106.

At step 504, in response to receiving the node data included in the submitted mortgage applications, the node connection engine 136 establishes connections between attributes, also referred to as nodes, of node data 110 associated with a particular transaction and also organizes the node data 110 obtained by the data mining/collection engine 132 into one or more nodal networks (i.e., node groupings) having nodal connections based on shared attributes between nodes associated with one or more transactions, as discussed previously with respect to FIGS. 3A and 3B. In addition, if node data 110 associated with two submitted mortgage applications share an applicant with one another, then the node data 110 associated with each of the two submitted mortgage applications are organized together into a node grouping along with any other node data that share any other attributes, such as property address, ID key, transaction type, and the like as discussed previously with respect to FIGS. 4A-4B. In addition, the node grouping may be based on one or more transient event priorities of the reviewers 104. That is, the one or more nodes included in a nodal network may be based on the one or more transient event priorities. For example, the node data 200 extracted from the submitted mortgage applications can include a new data node associated with seller identification when the one or more transient event priorities include originators monitoring. The node connection engine 136 can establish connections between the new data node and the one or more nodes of the node data.

At step 506, in response to a generation of node grouping data 112 for received node data 110, the processing scheme determination engine 138 determines a node grouping processing scheme that is used to detect transient event occurrence within a node grouping. The node grouping processing scheme can be based on one or more transient event priorities of the reviewers 104, such as fraud protection, protected class monitoring, and the like. In some implementations, the node grouping processing scheme can be a tiered decision scheme that includes one or more decision tiers that are used to detect the transient event occurrences. For example, the decision tiers can include an ID key tier, a transaction execution status tier, a transaction execution date tier, a shared applicant tier, a transaction type tier, a submission date tier, and a property address tier. Details regarding the decision tiers are discussed further herein. In some implementations, the processing scheme determination engine 138 determines an ordering of the one or more decision tiers based on the transient event priorities of the reviewers 104. In some examples, the processing scheme determination engine 138 can determine that another type of node grouping processing scheme can be implemented other than the tiered decision scheme.

At step 508, in response to the node grouping processing scheme being determined, a transient event detection engine 140 processes one or more node groupings according to the node grouping processing scheme. In some implementations, for a tiered decision scheme, each decision tier indicates whether the node data for a particular transaction within a node grouping is assigned to an existing transient event occurrence or whether an additional transient occurrence is generated for the node data. For example, if the submission dates of two submissions for a particular transaction are separated by more than a predetermined time period (e.g., 120 days), then an additional transient event occurrence is generated for the most recent submission. A particular node grouping, such as the node grouping 400 (FIG. 4) can include one or more than one transient event occurrence that is less than or equal to a number of transactions included in the node grouping. Details regarding the execution of the node grouping processing scheme are discussed further herein.

At step 510, in response to processing the node data for all of the transactions in the one or more node groupings, the transient event detection engine 140 outputs a report to the reviewers 104 indicating the performance metrics associated with the transient event occurrences along with any other statistics associated with the transient event priorities.

In one example, the transient event detection engine 140 tags a transaction as a suspicious transaction when an application associated with the identifier is marked as being potentially fraudulent. Further, the transient event detection engine 140 may automatically put a hold on the transaction nominally or in response to marking an identifier as being potentially fraudulent.

Figure 6:
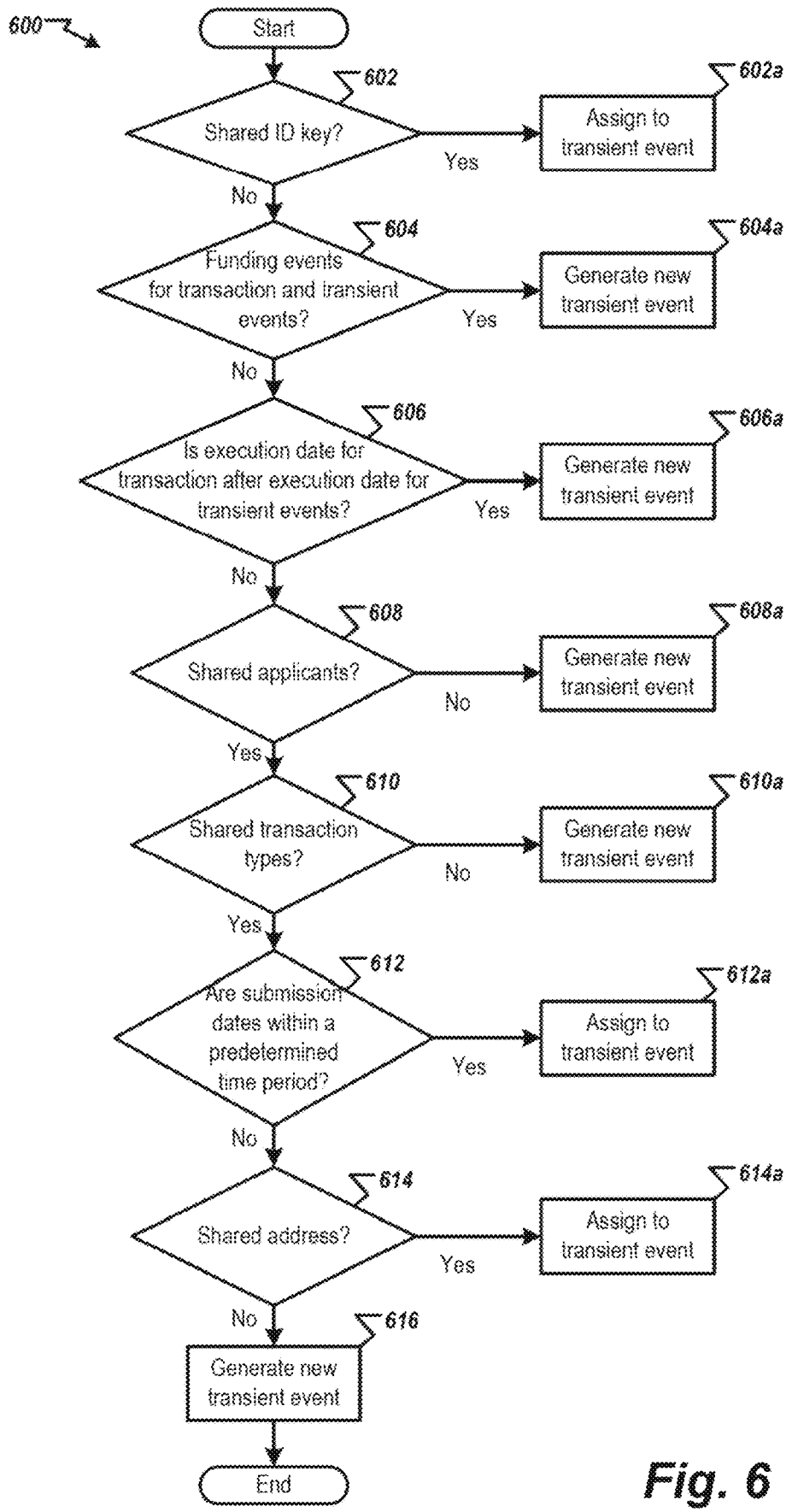
FIG. 6 is an exemplary flowchart of a node grouping processing scheme execution process.

FIG. 6 is an exemplary flowchart of a node grouping processing scheme execution process 600, which is an implementation of step 508 of the transient event detection process 500 and is performed by the transient event detection engine 140. The process 600 includes multiple decision tiers, such as an ID key tier, a transaction execution status tier, a transaction execution date tier, a shared applicant tier, a transaction type tier, a submission date tier, and a property address tier. An order of execution of the decision tiers is based on the transient event priorities. In addition, at each decision tier, the transient event detection engine 140 compares attributes of a transaction within a node grouping that has not yet been linked, also referred to as an unlinked transaction, to attributes of detected transient event occurrences associated with the node grouping to determine whether to link the transaction to a previously generated transient event occurrence or to generate an additional transient event occurrence. Any detected transient event occurrences detected during execution of the process 600 are stored in the data repository as transient event data 118.

At ID key decision tier 602, the transient event detection engine 140 determines whether an ID key for an unlinked transaction shares an ID key with a linked transaction included in a previously generated transient event occurrence. If the ID key for the unlinked transaction shares the ID key with a linked transaction associated with the transient event occurrence, resulting in a "yes" at decision tier 602, then the unlinked transaction is linked to the corresponding transient event occurrence at 602a. If the ID key for the unlinked transaction does not share the ID key with one of the linked transactions associated with the transient event occurrence, resulting in a "no" at decision tier 602, then the process continues to decision tier 604.

At transaction execution status tier 604, the transient event detection engine 140 determines whether a transaction execution status for the unlinked transaction and a transaction execution status for the linked transactions associated with the transient event occurrence correspond to a "funded" transaction execution status, indicating that a mortgage associated with the transaction has been originated. If the transaction execution status for the unlinked transaction and the linked transactions all correspond to a "funded" transaction execution status, resulting in a "yes" at decision tier 604, then the transient event detection engine 140 generates an additional transient event occurrence for the unlinked transaction 604a. If the transaction execution status for the unlinked transaction and the linked transaction do not all correspond to a "funded" transaction execution status, resulting in a "no" at decision tier 604, then the process 600 continues to decision tier 606.

At transaction execution status tier 606, the transient event detection engine 140 determines whether an execution date (e.g., origination date) associated with an unlinked transaction that has been funded occurs at a later date than execution dates for one or more linked transactions associated with transient event occurrences. If the execution date for the unlinked transaction is later than execution dates for one or more linked transactions associated with transient event occurrences, resulting in a "yes" at decision tier 606, then the transient event detection engine 140 generates an additional transient event occurrence for the unlinked transaction 606a. If the execution date for the unlinked transaction is not later than execution dates for one or more linked transactions associated with transient event occurrences, resulting in a "no" at decision tier 606, then the process 600 continues to decision tier 608.

At shared applicant decision tier 608, the transient event detection engine 140 determines whether an unlinked transaction shares at least one applicant with a linked transaction included in a previously generated transient event occurrence. If the unlinked transaction shares at least one applicant with a linked transaction associated with the transient event occurrence, resulting in a "yes" at decision tier 608, then the process 600 continues to decision tier 610. If the unlinked transaction does not share at least one applicant with one of the linked transactions associated with the transient event occurrence, resulting in a "no" at decision tier 608, then the transient event detection engine 140 generates an additional transient event occurrence for the unlinked transaction 608a.

At transaction type decision tier 610, the transient event detection engine 140 determines whether an unlinked transaction shares a transaction type (e.g., purchase, refinance) with a linked transaction included in a previously generated transient event occurrence. If the unlinked transaction shares a transaction type with a linked transaction associated with the transient event occurrence, resulting in a "yes" at decision tier 610, then the process 600 continues to decision tier 612. If the unlinked transaction does not share a transaction type with one of the linked transactions associated with the transient event occurrence, resulting in a "no" at decision tier 610, then the transient event detection engine 140 generates an additional transient event occurrence for the unlinked transaction 610a.

At submission date decision tier 612, the transient event detection engine 140 determines whether a submission date associated with an unlinked transaction is within a predetermined time period of submission dates associated with linked transactions included in a previously generated transient event occurrence. In some implementations, the processing scheme determination engine 138 determines the predetermined time period based on the transient event priorities. For example, if the transient event priorities are associated with fraud detection, then the predetermined time period may be longer than for other transient event priorities, such as 120 days. If the submission date associated with an unlinked transaction is within the predetermined time period of submission dates associated with linked transactions included in a previously generated transient event occurrence, resulting in a "yes" at decision tier 612, then the unlinked transaction is linked to the corresponding transient event occurrence at 612a. If the submission date associated with an unlinked transaction is not within the predetermined time period of submission dates associated with linked transactions included in a previously generated transient event occurrence, resulting in a "no" at decision tier 612, then the process 600 continues to decision tier 614.

At property address decision tier 614, the transient event detection engine 140 determines whether an unlinked transaction shares a property address with a linked transaction included in a previously generated transient event occurrence. If the unlinked transaction shares a property address with a linked transaction associated with the transient event occurrence, resulting in a "yes" at decision tier 614, then the unlinked transaction is linked to the corresponding transient event occurrence at 614a. If the unlinked transaction does not share a property address with one of the linked transactions associated with the transient event occurrence, resulting in a "no" at decision tier 614, then the transient event detection engine 140 generates an additional transient event occurrence for the unlinked transaction 616.

Referring again to FIGS. 4A and 4B, the transient event detection engine 140 detects at least two transient event occurrences within the node grouping 400. Transaction 420 does not share an applicant attribute with transaction 418. Thus, the transient event detection engine 140 generates an additional transient event occurrence for transaction 420, for example, at decision tier 608. Transactions 418 and 420 share a property address attribute 410a and thus are connected in the graphical representation 430 in FIG. 4B.

As described previously herein, the order of execution of the decision tiers may be based on the transient event priorities. In addition, the decision tiers included in the node grouping processing scheme may be selected based on the transient event priorities. For example, a common applicant tier may be included in the node grouping processing scheme (e.g., subsequent to decision tier 606 in FIG. 6) when the transient event priorities include individuals monitoring. The transient event detection engine 140 determines whether there is at least one applicant common across all transactions. If an unlinked transaction includes the at least one common applicant associated with the transient event occurrence, then the process 600 links the unlinked transaction to the transient event occurrence in response to determining that there is no subsequent decision tiers in the node grouping processing scheme or continues to subsequent decision tiers (e.g., decision tier 610). If the unlinked transaction does not include the at least one common applicant associated with the transient event occurrence, resulting in a "no" at the common applicant decision tier, then the transient event detection engine 140 generates an additional transient event occurrence for the unlinked transaction.

FIG. 7 illustrates an exemplary graph 700 that shows the effect of redundant data on an exemplary measured rate. Graph 700 includes curves for actual pull-through rates and apparent rate based on a percentage of double counting. A higher percentage of double counting leads to a lower apparent rate. As can be seen through the curves in graph 700, the overinflating of submitted loan applications leads to an artificially low loan pull-through rate calculation, which is a performance metric used by lenders or mortgage buyers that indicates a mortgage funding rate.

Figure 8A:
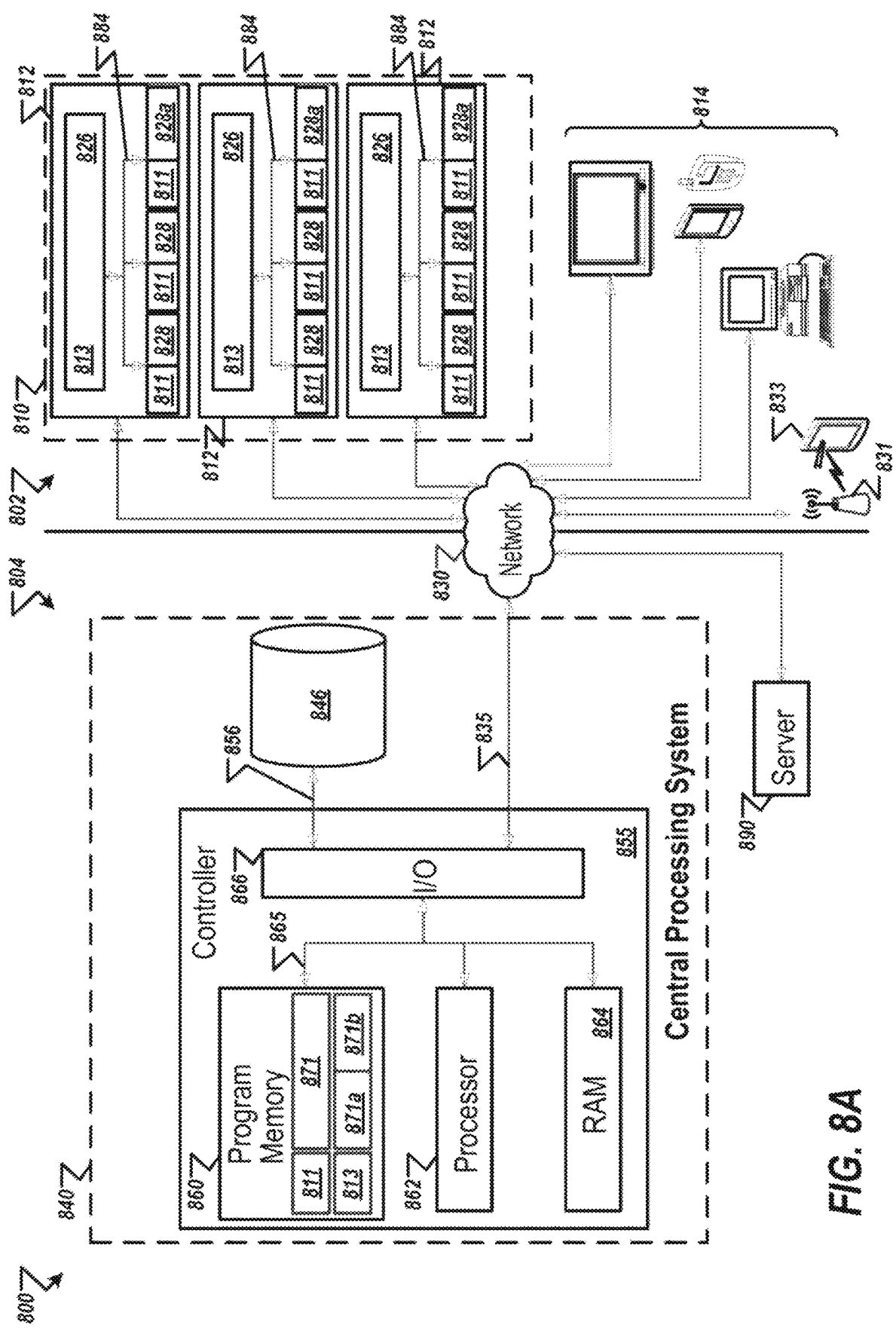
FIGS. 8A and 8B illustrate various aspects of an exemplary architecture implementing a platform for transient event detection.
Figure 8B:
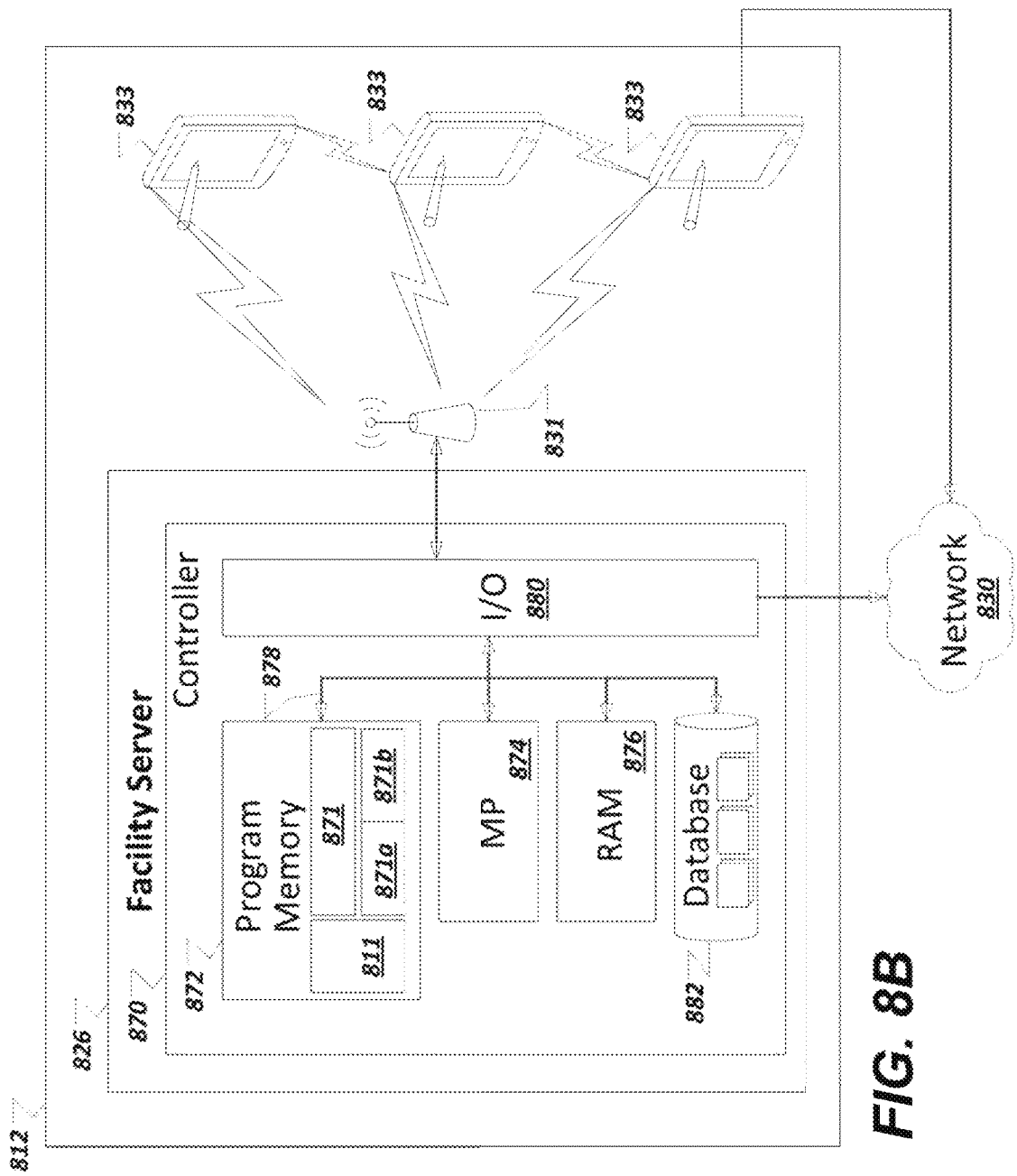

FIGS. 8A and 8B illustrate various aspects of an exemplary architecture implementing a platform 800 for detecting transient events. The high-level architecture includes both hardware and software applications, as well as various data communications channels for communicating data between the various hardware and software components. The platform 800 may be roughly divided into front-end components 802 and back-end components 804. The front-end components 802 are primarily disposed within a applicant or reviewer network 810 including one or more applicants or reviewers 812. The applicants or reviewers 812 maybe located, by way of example rather than limitation, in separate geographic locations from each other, including different areas of the same city, different cities, different states, or even different countries. The front-end components 802 may include a number of workstations 828. The workstations 828, for example, can be local computers located in the various locations 812 throughout the network 810 and executing various applications for detecting transient events.

Web-enabled devices 814 (e.g., personal computers, tablets, cellular phones, smart phones, web-enabled televisions, etc.) may be communicatively connected to locations 812 and the system 840 through a digital network 830 or a wireless router 831, as described below.

Referring now to FIG. 8A, the front-end components 802, in some embodiments, include a number of facility servers 826 disposed at the number of locations 812 instead of, or in addition to, a number of workstations 828. Each of the locations 812 may include one or more facility servers 826 that may facilitate communications between the web-enabled devices 814 and the back-end components 804 via a digital network 830, described below, and between the terminals 828, 828A of the locations 812 via the digital network 830, and may store information for a number of applicants/approvers/accounts/etc. associated with each facility. Of course, a local digital network 884 may also operatively connect each of the workstations 828 to the facility server 826. Unless otherwise indicated, any discussion of the workstations 828 also refers to the facility servers 826, and vice versa. Moreover, environments other than the locations 812, such as the kiosks, call centers, and Internet interface terminals may employ the workstations 828, the web-enabled devices 814, and the servers 826. As used herein, the term "location" refers to any of these points of contact (e.g., call centers, kiosks, Internet interface terminals, etc.) in addition to the locations 812, etc. described above.

The front-end components 802 communicate with the back-end components 804 via the digital network 830. One or more of the front-end components 802 may be excluded from communication with the back-end components 804 by configuration or by limiting access due to security concerns. For example, the web enabled devices 814 may be excluded from direct access to the back-end components 804. In some embodiments, the locations 812 may communicate with the back-end components via the digital network 830. In other embodiments, the locations 812 and web-enabled devices 814 may communicate with the back-end components 804 via the same digital network 830, but digital access rights, IP masking, and other network configurations may deny access of the web-enabled devices 814. The web-enabled devices may also connect to the network 830 via the encrypted, wireless router 831.

The digital network 830 may be a proprietary network, a secure public Internet, a virtual private network or some other type of network, such as dedicated access lines, plain ordinary telephone lines, satellite links, combinations of these, etc. Where the digital network 830 includes the Internet, data communication may take place over the digital network 830 via an Internet communication protocol. In addition to one or more web servers 890 (described below), the back-end components 804 may include a central processing system 840 within a central processing facility. Of course, the locations 812 may be communicatively connected to different back-end components 804 having one or more functions or capabilities that are similar to the central processing system 840. The central processing system 840 may include processing circuitry (e.g., one or more computer processors) 862 adapted and configured to execute various software applications and components of the platform 800, in addition to other software applications, such as a medication management system.

The central processing system 840, in some embodiments, further includes a database 846 (which may include one or more databases). The database 846 can be adapted to store data related to the operation of the platform 800. The central processing system 840 may access data stored in the database 846 when executing various functions and tasks associated with the operation of the platform 800.

Although the platform 800 is shown to include a central processing system 840 in communication with three locations 812, and various web-enabled devices 814 it should be understood that different numbers of processing systems, locations, and devices may be utilized. For example, the digital network 830 (or other digital networks, not shown) may interconnect the platform 800 to a number of included central processing systems 840, hundreds of locations 812, and thousands of web-enabled devices 814. According to the disclosed example, this configuration may provide several advantages, such as, for example, enabling near real-time uploads and downloads of information as well as periodic uploads and downloads of information. This provides for a primary backup of all the information generated in the wireless data transfer process. Alternatively, some of the locations 812 may store data locally on the facility server 826 and/or the workstations 828.

FIG. 8A also depicts one possible embodiment of the central processing system 840. The central processing system 840 may have a controller 855 operatively connected to the database 846 via a link 856 connected to an input/output (I/O) circuit 866. It should be noted that, while not shown, additional databases may be linked to the controller 855 in a known manner.

The controller 855 includes a program memory 860, the processing circuitry 862 (may be called a microcontroller or a microprocessor), a random-access memory (RAM) 864, and the input/output (I/O) circuit 866, all of which are interconnected via an address/data bus 865. It should be appreciated that although only one microprocessor 862 is shown, the controller 855 may include multiple microprocessors 862. Similarly, the memory of the controller 855 may include multiple RAMs 864 and multiple program memories 860. Although the I/O circuit 866 is shown as a single block, it should be appreciated that the I/O circuit 866 may include a number of different types of I/O circuits. The RAM(s) 864 and the program memories 860 may be implemented as semiconductor memories, magnetically readable memories, and/or optically readable memories, for example. A link 835 may operatively connect the controller 855 to the digital network 830 through the i/O circuit 866.

FIG. 8B depicts one possible embodiment of the front-end components 802 located in one or more of the locations 812 from FIG. 8A. Although the following description addresses the design of the locations 812, it should be understood that the design of one or more of the locations 812 may be different from the design of others of the locations 812. Also, each of the locations 812 may have various different structures and methods of operation. It should also be understood that while the embodiment shown in FIG. 8B illustrates some of the components and data connections that may be present in a location 812, it does not illustrate all of the data connections that may be present in a location 812. For exemplary purposes, one design of a location is described below, but it should be understood that numerous other designs may be utilized.

Each of the locations 812, as illustrated, has one or more portable computing devices 833 (e.g., notebook computers, tablet computers, smart phones, personal data assistants, etc.) and/or a facility server 826. The digital network 884 and wireless router 831 operatively connect the facility server 826 to the number of portable computing devices 833 and/or to other web-enabled devices 814 and workstations 828. The digital network 830 may be a wide area network (WAN), a local area network (LAN), or any other type of digital network readily known to those persons skilled in the art. The digital network 830 may operatively connect the facility server 826, the portable computing devices 833, the workstations 828, and/or the other web-enabled devices 814 to the central processing system 840.

Each portable computing device 833, workstation 828, user device terminal 828a, or facility server 826 includes a controller 870, as depicted in FIG. 8B in relation to the server 826. Similar to the controller 855 from FIG. 8A, the controller 870 includes a program memory 872, processing circuitry (e.g., one or more microcontrollers or microprocessors) 874, a random-access memory (RAM) 876, and an input/output (I/O) circuit 880, all of which are interconnected via an address/data bus 878. In some embodiments, the controller 870 may also include, or otherwise be communicatively connected to, a database 882. The database 882 (and/or the database 846 of FIG. 8A) includes data such as the data stored in the data repository 18 (FIG. 1). As discussed with reference to the controller 855, it should be appreciated that although FIG. 8B depicts only one microprocessor 874, the controller 870 may include multiple microprocessors 874. Similarly, the memory of the controller 870 may include multiple RAMs 876 and multiple program memories 872. Although the FIG. 8B depicts the i/O circuit 880 as a single block, the I/O circuit 880 may include a number of different types of I/O circuits. The controller 870 may implement the RAM(s) 876 and the program memories 872 as semiconductor memories, magnetically readable memories, and/or optically readable memories, for example.

Either or both of the program memories 860 (FIG. 8A) and 872 may also contain machine-readable instructions (i.e., software) 871, for execution within the processing circuitry 862 (FIG. 8A) and 874, respectively. The software 871 may perform the various tasks associated with operation of the location or locations, and may be a single module 871 or a number of modules 871a, 871b. While the software 871 is depicted in FIGS. 8A and 8B as including two modules, 871a and 871b, the software 871 may include any number of modules accomplishing tasks related to location operation.

In addition to the controller 870, the portable computing devices 833, the workstations 828 and the other web-enabled devices 814 may further include a display and a keyboard as well as a variety of other input/output devices (not shown) such as a scanner, printer, mouse, touch screen, track pad, track ball, isopoint, voice recognition system, digital camera, bar code scanner, RFID reader, etc. A applicant 102 or reviewer 104 may sign on and occupy each portable computing device 833, workstation 828 or user device terminal 828a to assist the employee in performing his or her duties. Employees may sign onto the portable computing device 833, workstation 828 or the user device terminal 828a using any available technique, such as entering a user name and password. If an employee signs on to the system using a portable computing device 833, the network 884 communicates this information to the facility server 826, so that the controller 870 may identify which employees are signed onto the platform 800 and which portable computing device 833, workstation 828 or user device terminal 828a the employee is signed onto.

Various software applications resident in the front-end components 802 and the back-end components 804 implement functions related to location operation, and provide various user interface means to allow users to access the platform 800. One or more of the front-end components 802 and/or the back-end components 804 may include a user-interface application 811 for allowing a user to input and view data associated with the platform 800, and to interact with the platform described herein. In one embodiment, the user interface application 811 is a web browser applicant, and the facility server 826 or the central processing system 840 implements a server application 813 for providing data to the user interface application 811. However, the user interface application 811 may be any type of interface, including a proprietary interface, and may communicate with the facility server 826 or the central processing system 840 using any type of protocol including, but not limited to, file transfer protocol (FTP), telnet, hypertext-transfer protocol (HTTP), etc. Moreover, some embodiments may include the user interface application 811 running on one of the web-enabled devices 814, while other embodiments may include the application 811 running on the portable computing device 833 in a location 812. The central processing system 840 and/or the facility server 826 may implement any known protocol compatible with the user-interface application 811 running on the portable computing devices 833, the workstations 828 and the web-enabled devices 814 and adapted to the purpose of receiving and providing the necessary information during the data transfer process.

Figure 8C:
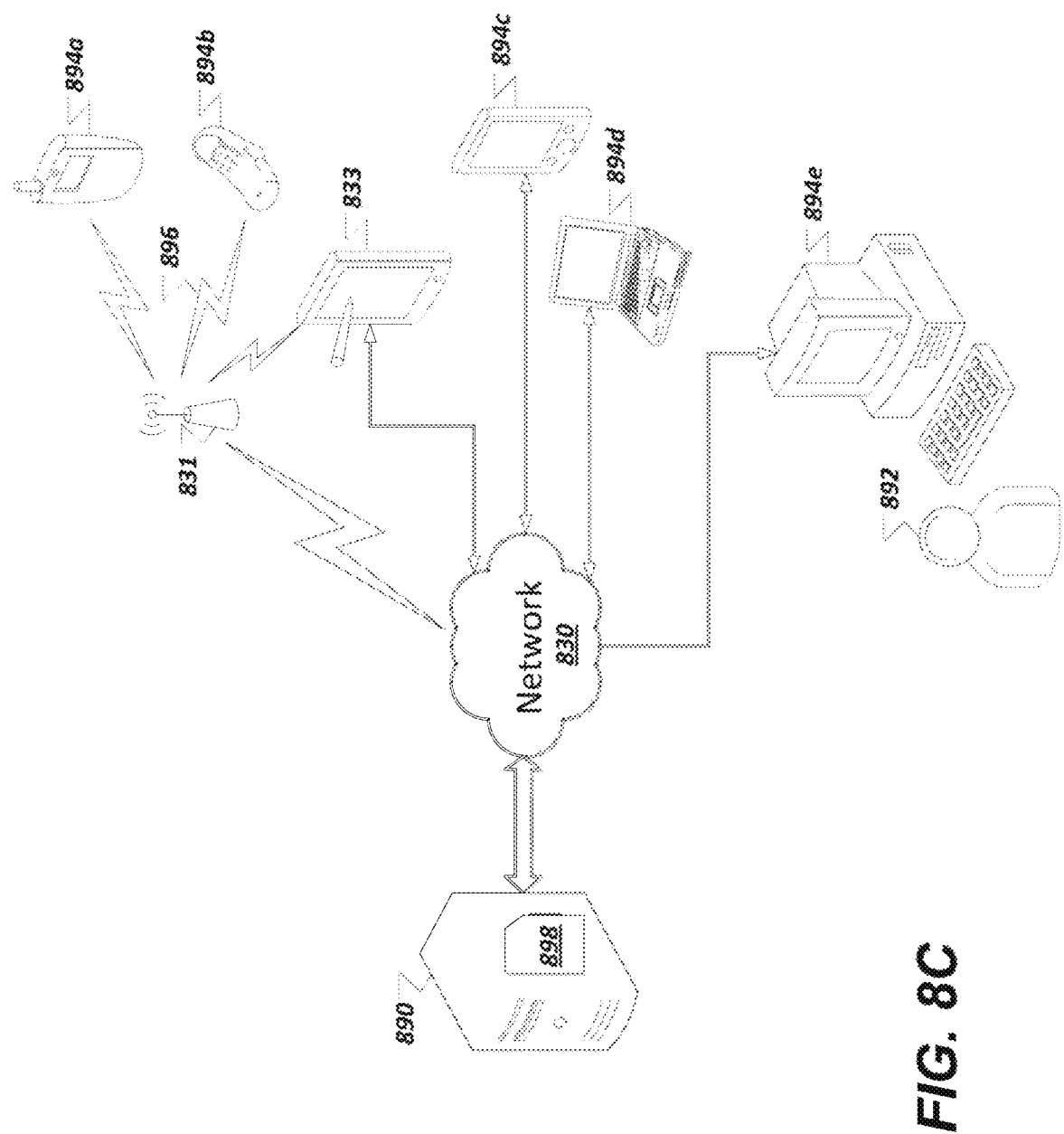

For purposes of implementing the platform 800, the user interacts with location systems (e.g., the central processing system 840) via a number of web pages. FIG. 8C depicts a web server 890 connected via the network 830 to a number of portable computing devices 833 and other web-enabled devices through which a user 892 may initiate and interact with the platform 800. The web enabled devices may include, by way of example, a smart-phone 894*a*, a web-enabled cell phone 894*b*, a tablet computer 833, a personal digital assistant (PDA) 894*c*, a laptop computer 894*d*, a desktop computer 894*e*, a portable media player (not shown), etc. Of course, any web-enabled device appropriately configured may interact with the platform 800. The web-enabled devices 833 and 894 need not necessarily communicate with the network 830 via a wired connection. In some instances, the web enabled devices 833 and 894 may communicate with the network 830 via wireless signals 896 and, in some instances, may communicate with the network 830 via an intervening wireless or wired device 831, which may be a wireless router, a wireless repeater, a base transceiver station of a mobile telephony provider, etc. Each of the web-enabled devices 833 and 894 may interact with the web server 890 to receive web pages, such as the web page 898 depicted in FIG. 8C, for display on a display associated with the web-enabled device 833 and 894. It will be appreciated that although only one web server 890 is depicted in FIG. 8C, multiple web servers 890 may be provided for the purpose of distributing server load, serving different web pages, implementing different portions of the location web interface, etc.

One or more processors can be utilized to implement any functions and/or algorithms described herein, unless explicitly stated otherwise. Additionally, any functions and/or algorithms described herein, unless explicitly stated otherwise, can be performed upon virtual processing circuitry (e.g., one or more virtual processors, for example on one or more physical computing systems such as a computer farm or a cloud drive).

Reference has been made to flowchart illustrations and block diagrams of methods, systems and computer program products according to implementations of this disclosure. Aspects thereof are implemented by computer program instructions. These computer program instructions may be provided to processing circuitry of a general purpose computer, special purpose computer, or other programmable data processing apparatus to produce a machine, such that the instructions, which execute via the processing circuitry of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The implementations described herein are directed to a transient event detection system 108 that can detect time-limited events based on relationships between shared nodal attributes between transactions rather than on the attributes themselves, which reduces or eliminates inaccurate performance metric calculations. In certain aspects, the transient event detection system 108 automates and expedites processing and detection of transient event occurrences. For example, processing incoming node data over a predetermined period of time can create a processing burden on processing resources of the transient event detection system 108 due to sheer volume of transactions and relationships between the attributes of the transactions. For example, a nodal network that includes all connections between all node data received by the transient event detection system 108 could result in millions of distinct nodes with multiple connections therebetween.

To address this concern, the transient event detection system 108 can efficiently and effectively organize the node data into the node groupings which drastically reduces a number of nodes that are processed when detecting transient event occurrences. For example, when identifying a transient event associated with a particular submitted mortgage application, the transient event detection system 108 only processes the node grouping associated with the submitted application rather than all of the node data stored in a data repository of the system. The transient event detection system 108 therefore represents a technical solution to a technical problem that has plagued the industry by causing inaccurate performance metric calculations that may affect strategic business decisions. Using the system, lenders will be provided more accurate performance metrics related to number of transactions and pull-through rate due to the significant technological improvements provided by the system.

The transient event detection system 108 also provides improvements to various technical fields such as data management, data storage, graphical/nodal analysis and artificial intelligence. For example, the processes executed by the transient event detection system 108 can also be applied to other technical fields where transient events occur, such as for streaming video selections where multiple members of a household may be searching for a streaming video to watch on different devices. The transient event detection system 108 could be used to link video searches together based on shared attributes (i.e. family members, address, movie genre, etc) in order to make more accurate viewing recommendations to the household members. Accordingly, the transient event detection system 108 presents significantly more than any abstract idea through at least the above-noted improvements.

A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components. The functions, processes and algorithms described herein may be performed in hardware or software executed by hardware, including computer processing circuitry (e.g., processors and/or programmable circuits) configured to execute program code and/or computer instructions to execute the functions, processes and algorithms described herein. Additionally, some implementations may be performed on modules or hardware not identical to those described. Accordingly, other implementations are within the scope that may be claimed.

The invention claimed is:

1. A device, comprising:
 processing circuitry configured to:
  receive, from at least one computing device, node data of plural nodes, each node including attribute values;
  store the received node data, including the attribute values of the plural nodes;
  analyze the stored node data to generate one or more node networks corresponding to one or more node groupings, each node grouping including nodes of the node data having one or more common attribute values, wherein the generated one or more node networks represent, for each common attribute value, connections among the nodes of the node data that have the common attribute value; and
  detect one or more transient event occurrences within the one or more node groupings based on the one or more common attribute values within each node grouping,
  wherein each of the one or more transient event occurrences includes a plurality of transaction identification keys.

2. The device of claim 1, wherein the attribute values include one or more applicants and at least one of an identification key, a submission number, a submission date, a property address, transaction execution data, a transaction type, and a transaction execution date.

3. The device of claim 1, wherein each node includes attribute values corresponding to a transaction and one of the attribute values of each node indicates a status of the respective transaction.

4. The device of claim 1, wherein, in the detecting the one or more transient event occurrences, the processing circuitry is further configured to determine an ordering of one or more decision tiers, each of the one or more decision tiers comprising analysis of one or more defined common attribute values.

5. The device of claim 4, wherein the one or more decision tiers include at least one of an identification key tier, a transaction execution tier, a transaction date tier, a shared applicant tier, a transaction type tier, a submission date tier, and a property address tier.

6. The device of claim 5, wherein the processing circuitry is further configured to execute at least one of the one or more decision tiers to determine whether an unlinked node is to be linked to one or more detected transient event occurrences.

7. The device of claim 1, wherein the processing circuitry is further configured to link a node to a transient event occurrence in response to determining that a first identification key attribute of the node corresponds to a second identification key for the transient event occurrence.

8. The device of claim 1, wherein the processing circuitry is further configured to generate an additional transient event occurrence in response to determining that a node has an execution status attribute that does not correspond to execution statuses associated with the one or more detected transient event occurrences.

9. The device of claim 1, wherein the processing circuitry is further configured to generate an additional transient event occurrence for a node in response to determining that the node has a corresponding execution date attribute that is later than execution dates for the one or more detected transient event occurrences.

10. The device of claim 1, wherein the processing circuitry is further configured to generate an additional transient event occurrence for a node in response to determining that the node does not share an applicant attribute with the one or more detected transient event occurrences.

11. The device of claim 1, wherein the processing circuitry is further configured to generate an additional transient event occurrence for a node in response to determining that the node does not share a transaction type attribute with the one or more detected transient event occurrences.

12. The device of claim 1, wherein the processing circuitry is further configured to link a node to a transient event occurrence in response to determining that a first submission date attribute associated with the node is within a predetermined time period of one or more second submission dates associated with the transient event occurrence.

13. The device of claim 12, wherein the processing circuitry is further configured to determine the predetermined time period based on one or more transient event detection priorities.

14. The device of claim 1, wherein the processing circuitry is further configured to link a node to a transient event occurrence in response to determining that a first property address attribute associated with the node corresponds to a second property address associated with the transient event occurrence.

15. The device of claim 13, wherein the processing circuitry is further configured to determine the one or more transient event detection priorities based on an input received from the at least one computing device.

16. The device of claim 15, wherein the one or more transient event detection priorities include at least one of a fraud detection priority and a protected minority group priority.

17. The device of claim 1, wherein the processing circuitry is further configured to output, in response to detecting the one or more transient event occurrences, a transient event report to the at least one computing device.

18. A method for a computing system that includes processing circuitry, the method comprising:
 receiving, from at least one computing device, node data of plural nodes, each node including attribute values;
 storing the received node data, including the attribute values of the plural nodes;
 analyzing, by the processing circuitry, the stored node data to generate one or more node networks corresponding to one or more node groupings, each node grouping including nodes of the node data having one or more common attribute, wherein the generated one or more node networks represent, for each common attribute value, connections among the nodes of the node data that have the common attribute value; and
 detecting one or more transient event occurrences within the one or more node groupings based on the one or more common attribute values within each node grouping,
 wherein each of the one or more transient event occurrences includes a plurality of transaction identification keys.

19. A non-transitory computer readable medium having instructions stored thereon, wherein the instructions, when executed by processing circuitry, cause the processing circuitry to:

receive, from at least one computing device, node data of plural nodes, each node including attribute values;

store the received node data, including the attribute values of the plural nodes;

analyze the stored node data to generate one or more node networks corresponding to one or more node groupings, each node grouping including nodes of the node data having one or more common attribute values, wherein the generated one or more node networks represent, for each common attribute value, connections among the nodes of the node data that have the common attribute value; and detect one or more transient event occurrences within the one or more node groupings based on the one or more common attribute values within each node grouping, wherein each of the one or more transient event occurrences includes a plurality of transaction identification keys.

* * * * *